(Model.)
N. HIATT.
NECK YOKE CLASP.
No. 250,535. Patented Dec. 6, 1881.
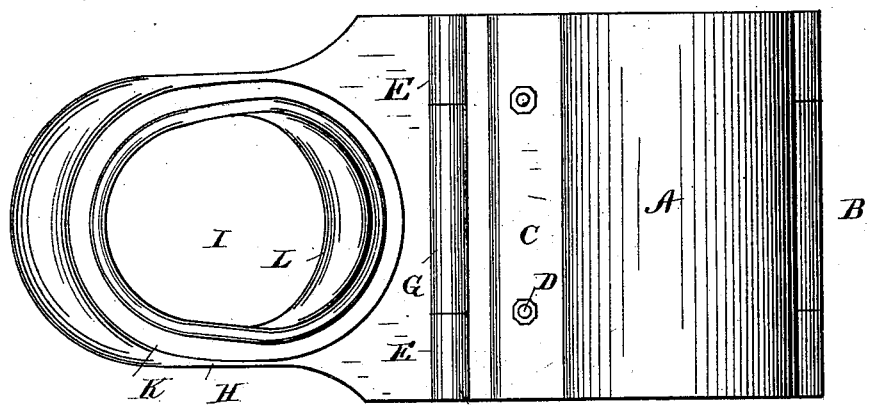
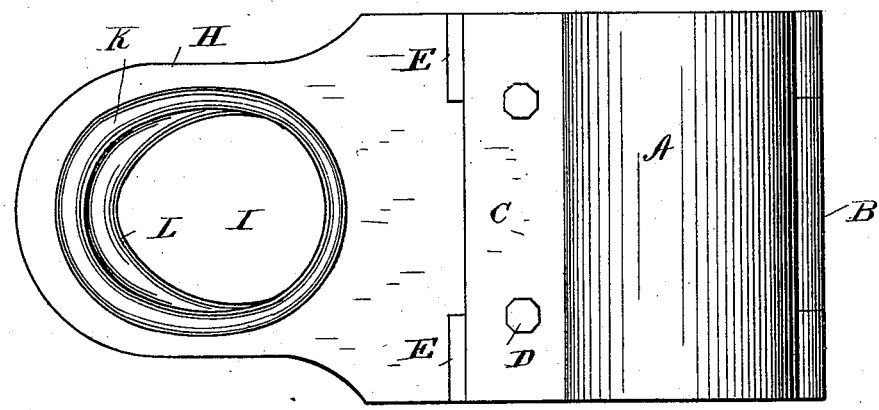
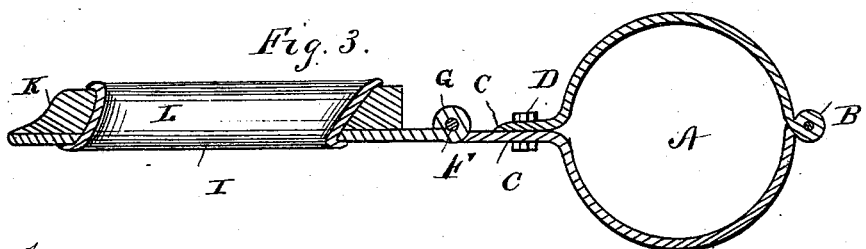
Witnesses,
Edwin L. Yewell,
J. J. McCarthy.
Inventor
Nicholas Hiatt,
per C. M. Alexander,
Attorney.

UNITED STATES PATENT OFFICE.

NICHOLAS HIATT, OF INDEPENDENCE, KANSAS.

NECK-YOKE CLASP.

SPECIFICATION forming part of Letters Patent No. 250,535, dated December 6, 1881.

Application filed September 17, 1881. (Model.)

*To all whom it may concern:*

Be it known that I, NICHOLAS HIATT, of Independence, in the county of Montgomery, and in the State of Kansas, have invented certain new and useful Improvements in Neck-Yoke Clasps for Buggies, Carriages, Wagons, and other Vehicles; and I do hereby declare that the following is a full, clear, and exact description thereof, reference being had to the accompanying drawings, and to the letters of reference marked thereon, making a part of this specification.

This invention relates to an improved pole attachment for the neck-yokes of harness; and it has for its objects to provide an improved device that may be conveniently attached to the neck-yoke without the use of bolts, which weaken the said yoke, and which will yield between the point of attachment of the pole and neck-yoke, relieving the parts of all injurious strain, and which will not be liable to become accidentally detached from the pole. These objects I attain by the devices illustrated in the accompanying drawings, in which—

Figure 1 represents a rear elevation of my improved device; Fig. 2, a front view thereof, and Fig. 3 a transverse sectional view of the same.

The letter A indicates the portion of the device which embraces the bar of the neck-yoke. This is constructed in two parts, hinged together at the top, as indicated by the letter B, and provided at their lower adjoining edges with flanges C, which are provided with suitable apertures for the passage of the screw-bolts D, by means of which the parts may be clamped together, so as to be confined upon the neck-yoke bar and held thereon without passing the bolts through said bar. One of the said flanges C extends below the other, and is bent so as to form the seats E for a pintle, F, to which is hinged the upper part, G, of the lower portion, H, of the device, which is provided with an aperture, I, for the pole of the vehicle. The said lower portion on its forward side is provided with a boss, K, and the aperture through said lower portion and the boss attached thereto is provided with a metallic bushing, L, which is beveled outwardly and downwardly at the top and downwardly and forwardly at the bottom, as clearly shown in Fig. 3, to receive the pole and hold it in proper position. The bushing is secured to the boss and lower portion, H, by turning down its outer edges on opposite sides, as clearly indicated. This not only firmly secures the bushing to the boss, but rounds off the edges of the aperture, so as to prevent injury to the pole, and further serves to bind the boss firmly to the lower portion without the use of screws or similar fastening devices.

As thus constructed, it will be perceived that the device may be clamped around the yoke-bar, without weakening the same, by passing bolts or screws through it; that by reason of the lower hinge the parts will yield to each other without injurious strain upon either; and that the peculiar construction of the pole aperture, its boss, and bushing will tend to hold the pole in proper position and prevent its accidental removal if the traces should become detached, as the lower portion would swing upon its hinge into such position that its edges would securely bind upon the pole and firmly hold it.

Having thus described my invention, what I claim, and desire to secure by Letters Patent, is—

The combination, with the lower hinged section, of a neck-yoke clasp provided with an aperture, as described, the boss having an inclined aperture, and the metallic bushing secured in the apertures in the boss and lower section by turning down its edges, substantially as and for the purpose specified.

In testimony that I claim the foregoing I have hereunto set my hand this 8th day of September, 1881.

NICHOLAS HIATT.

Witnesses:
ED VAN GUNDY,
H. T. MILLIS.